July 21, 1953  W. L. GILL  2,646,459
ELECTRIC STORAGE BATTERY VENTING SYSTEM
Filed Oct. 9, 1951  2 Sheets-Sheet 2
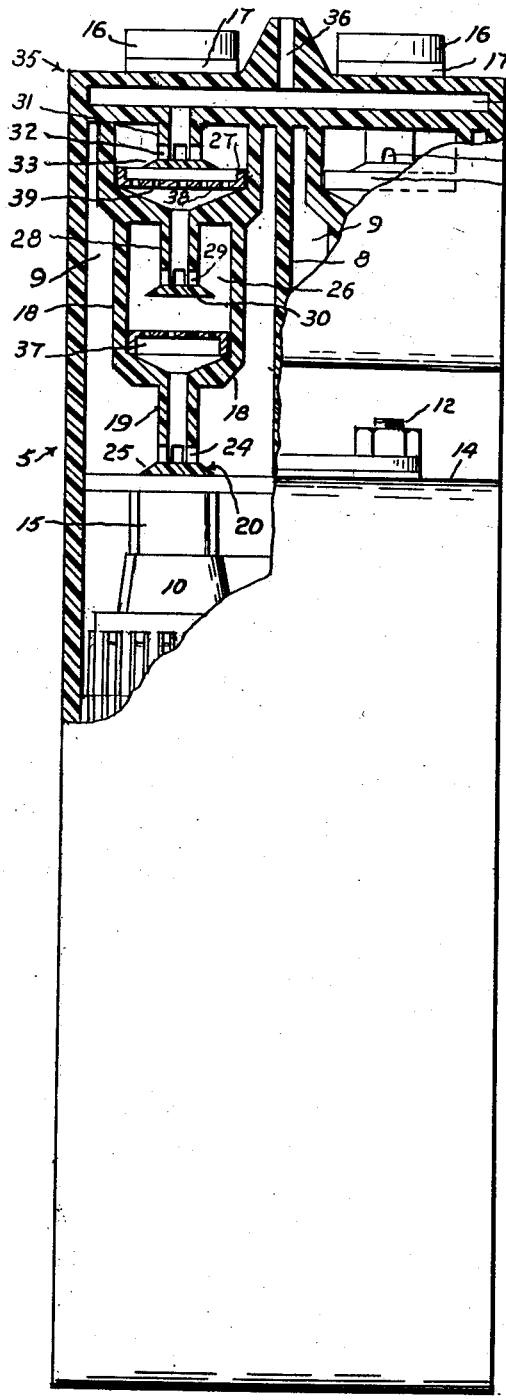
Fig. 2.
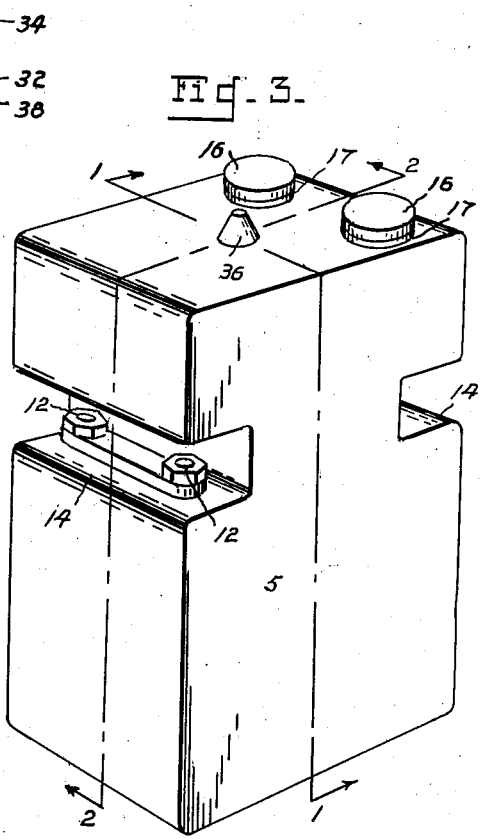
Fig. 3.
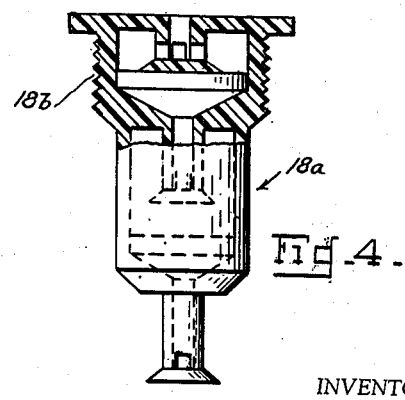
Fig. 4.
INVENTOR
Walter L. Gill
BY 
ATTORNEYS Patented July 21, 1953

2,646,459

UNITED STATES PATENT OFFICE 2,646,459

ELECTRIC STORAGE BATTERY VENTING SYSTEM

Walter L. Gill, Redlands, Calif.

Application October 9, 1951, Serial No. 250,416

5 Claims. (Cl. 136—177)

1

This invention relates to a venting system and apparatus for electric storage batteries. While it may be used in conjunction with many different types of batteries it is especially intended for use in aircraft batteries where the battery is likely to be tipped to many different positions, or even completely inverted.

The primary object of the invention is to provide a battery venting means constructed to permit escape of gas, while preventing escape of electrolyte, during gassing of the battery.

A further important object of the invention is to provide a venting apparatus which will, while maintaining gas venting communication with the atmosphere, prevent escape of electrolyte, irrespective of the position to which the battery may be tilted.

It is also an object of the invention to accomplish the foregoing results through means comprising no moving parts, such as check valves or any elements likely to become stuck shut, when corroded by battery acids or other causes.

The invention will be best understood by reference to the accompanying drawings, wherein:

Fig. 2 is a view partly in vertical section and partly in elevation, along line 1—1 of Fig. 3;

Fig. 3 is a perspective view of the structures of Figs. 1 and 2; and

Fig. 4 is a side view of a slightly modified form of the device.

Figure 1:
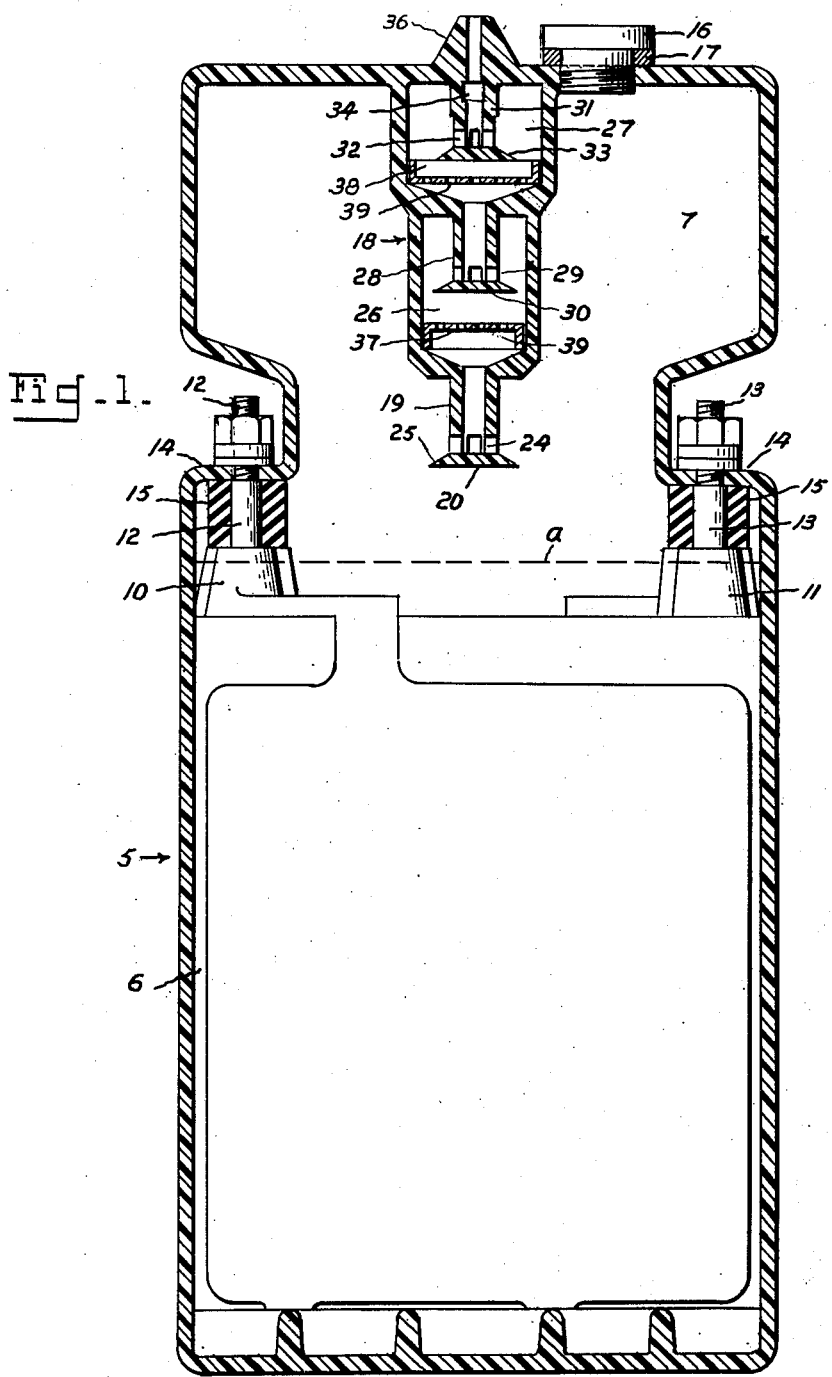
Fig. 1 is a vertical sectional view of a battery constructed in accordance with my invention, the section being taken along line 2—2 of Figure 3.

A two cell battery has been illustrated but it will be understood that any desired number of cells may be provided. In carrying out the invention I provide a battery box or jar 5 shaped to constitute a lower, main chamber 6 and an upper, auxiliary chamber 7. Where a multiple cell battery is to be employed, vertical partitions 8 divide the interior of the jar into the desired number of cells 9. Thus each cell has its lower main chamber 6 and its auxiliary upper chamber 7, said chambers being in free and open communication with each other, so that upon inversion of the battery the electrolyte may readily pass into the auxiliary chamber.

The lower chamber 6 of each cell receives the plates, separators and electrolyte commonly employed in the make up of electric storage batteries. All of the plates of one polarity are connected to a post 10 and all of the plates of the opposite polarity are connected to a post 11. Post bolts 12 and 13 which project upwardly from these posts, and through shouldered portions 14 of the

2 jar, constitute the positive and negative connections for the several cells. The post bolts are sealed by being extended through rubber seals 15. The formation of the shouldered portions 14 upon the jars has the effect of indenting the side walls of the jars, as shown, so that the post bolts 12 and 13 lie in protected position inside of the vertical plane of the side walls of the jars. Thus when a plurality of these jars are to be shipped they may be packed in contact with each other with the terminal connections safe from damage. This same indenting of the side walls of the jars provides an area of reduced width (Fig. 1) and this in turn increases the height of the jar to such an extent that the inner end of tubular venting means hereinafter described, will, when projected into such area of reduced width, lie above the level of the electrolyte when the jar is inverted, as hereinafter set forth.

Any suitable method of filling the cells to normal electrolyte level (which will be about line a) may be used. I have illustrated filler plugs 16 seated upon soft rubber gaskets 17. Through the openings which are normally closed by these plugs, the cells may be filled or individual cell gravity readings may be taken.

In carrying out the invention I provide venting means comprising a tubular structure designated in a general way at 18. It contains within its interior flow retarding means, hereinafter described, and it terminates at its inner or lower end in a tube 19. This tube is provided upon its bottom with a baffle cap 20 the function of which is to prevent direct axial and speedy flow into tube 19. Orifices 24 are formed in the wall of tube 19 immediately above the baffle cap and the upper face 25 of this cap is sloped downwardly and outwardly to direct any electrolyte adhering to the tube, back into the jar. Since any flow into the tube must be through orifices 24 and since these orifices are protected by the baffle cap 20 it follows that little if any of the electrolyte will find its way into the tube, when the battery is tipped, or even inverted; it being understood that the capacity of chamber 7 is such, that with the battery inverted and all of the electrolyte in said chamber, the orifices 24 will be above the level of the electrolyte.

The tubular structure, designated generally at 18 may be divided into a plurality of electrolyte trapping compartments. I have shown two of such compartments 26 and 27. The tube 19 depends from the bottom of the lower compartment 26 and a like tube 28 depends from the bottom of compartment 27 and into chamber 26. This tube 28 has lateral orifices 29 and a baffle cap 30 which correspond to the like elements of tube 19. A tube 31 having like orifices 32 and baffle cap 33 depends from the top of the cell into chamber 27. This tube may lead directly to the atmosphere or it may communicate with bore 34 of a manifold 35 that is common to both of the cells and is in turn vented at 36 to the atmosphere. I preferably, though not necessarily, dispose in the chambers 26 and 27 floating, or freely movable baffle discs 37 and 38. These, like the battery jar and the tubular assemblies 18, are made of plastic, hard rubber or like non-corrosive material. They are simple cup like discs having a multiplicity of holes 39 through them. Their function is to act merely as flow retardents. Since the escaping gases must pass through the multiplicity of small holes any bubbles will be broken up and there will be less likelihood of any of the electrolyte being carried off with the gas.

Since the tubes 28 and 31 project into the chambers 26 and 27 it follows that these chambers constitute traps for any electrolyte which may find its way into them by splashing or otherwise, as the batteries are more or less violently tipped or inverted, such electrolyte being fed back into the main chamber, as the plane by which the battery is carried, comes back to upright position.

In Fig. 4 I have indicated that a venting means 18a corresponding to tubular venting structure 18 may be provided with screw threads 18b by which it may be screwed into a filler opening of a battery, there to perform the double function of a cell closure and a venting means as described.

While I have shown the whole battery jar 5 as practically an integral structure it is of course merely a manufacturing detail to make the lower part containing chamber 6, separate from the upper part containing chamber 7 and afterward cement, fuse or otherwise unite them.

While I have shown a plurality of trapping chambers within the tubular structure 18 the invention is not necessarily limited thereto, the important thing being to provide a superimposed chamber 7 of such capacity that the lower end of the tubular structure will be left uncovered by the electrolyte when the battery is inverted. Flow retarding means are also highly desirable to prevent electrolyte from being splashed too rapidly toward the gas escape exit. In ordinary types of batteries it is a common fault for the venting system to allow electrolyte to escape along with the escaping gas. Also the ordinary non-spill type battery allows the electrolyte to remain in the venting system to be forced out whenever the gas pressure becomes sufficient to do so. By having the auxiliary chamber 6 and main chamber 7 in free and open communication with each other, that is, without a separating wall therebetween, I am able to project the tubes 19 inwardly, toward the main chamber 6, far enough to insure that, with the battery inverted and all of the electrolyte in chamber 7, the inner ends of tubes 19 and the orifices 24 will lie above the liquid level.

It is to be understood that the invention is not limited to the precise construction set forth but that it includes within its purview whatever changes fairly come within either the terms or the spirit of the appended claims.

Having described my invention, I claim:

1. A structure as recited in claim 3 in combination with a cup-like disc mounted in and spanning one of said compartments at a point below the baffle plate of said compartment, said disc having a multiplicity of perforations in its portion which extends across said compartment and being mounted for free floating movement axially of said compartment.

2. An invertible storage battery consisting of a closed battery jar comprising a lower conventional plate and electrolyte receiving chamber and a superimposed auxiliary chamber of a capacity to receive all of the electrolyte when the battery jar is inverted, a venting element depending from the top of the jar into said auxiliary chamber, said venting element comprising a first compartment depending from the top of the battery jar into said jar, a second compartment depending from the bottom of the first compartment, a tubular member depending from the top of the jar into the first compartment and vented at its top to the atmosphere, a second tubular member depending from the bottom of the first compartment into the second compartment, a third tubular member depending from the bottom of the second compartment into said battery jar, baffle plates closing the bottoms of the respective tubular members, ports through the walls of said tubular members above the baffle plates, and a freely floating loose baffle disc in each of said compartments located below the respective baffle plates therein each disc having a multiplicity of holes therethrough and each of said discs being of a diameter to substantially span the entire width of its compartment.

3. An invertible storage battery consisting of a closed battery jar comprising a main lower conventional plate and electrolyte receiving chamber and a superimposed auxiliary chamber normally disposed above said main chamber and of a capacity to receive all of the electrolyte when the battery jar is inverted, said chambers being in free and open communication across their confronting portions, a venting element depending from the top of the jar into said auxiliary chamber, said venting element comprising a plurality of superimposed compartments having tubular members projecting from their lower ends, baffle plates upon the lower ends of said tubular members, lateral orifices located immediately above said baffle plates in the walls of said tubular members, one of said tubular members projecting into one of said compartments and the other of said tubular members projecting from the bottom of the last named compartment far enough into the auxiliary chamber to lie above the electrolyte level when the jar is inverted.

4. An invertible storage battery consisting of a closed jar comprising a lower conventional plate and electrolyte receiving chamber, and a superimposed upper chamber, the side walls of the jar being indented to form recesses the bottoms of which present shouldered portions of the lower compartment, a plurality of plates in the lower compartment, common connecting members for the plates of like polarity, posts upstanding from the common connecting members and projecting through said shouldered portions of the lower compartment into said recesses, the indenting of the side walls of the jar creating an area of less width than the upper and lower compartments, which lies between and separates said compartments, the capacity of the upper compartment being such as to contain all of the electrolyte when the battery is inverted, and gas venting means comprising a tubular structure depending from the top of the jar and provided with escape ports for gas, the lower end of said venting means terminating in the said area of reduced width.

5. A structure as recited in claim 4 wherein said venting means includes a pair of superimposed chambers the outer of which is of greater diameter than the inner, a venting tube projecting from the top of the jar into the first chamber, a vent tube projecting from the bottom of the outer chamber into the inner chamber, and a vent tube projecting from the bottom of the inner chamber, to and into the area of reduced width, all of said tubes having their inner ends closed and ports above said inner ends which lead to the interior of said tubes.

WALTER L. GILL.

References Cited in the file of this patent

UNITED STATES PATENTS

| Number | Name | Date |
|---|---|---|
| 1,163,991 | Ford | Dec. 14, 1915 |
| 1,240,856 | Kammerhoff | Sept. 25, 1917 |
| 1,327,650 | Willard | Jan. 13, 1920 |
| 1,583,871 | Davis | May 11, 1926 |
| 1,829,935 | Klock | Nov. 3, 1931 |
| 2,049,201 | Dunzweiler et al. | July 28, 1936 |
| 2,182,492 | Hall | Dec. 5, 1939 |
| 2,185,097 | Woodbridge | Dec. 26, 1939 |
| 2,214,803 | Wells | Sept. 17, 1940 |
| 2,349,031 | Doughty | May 16, 1944 |
| 2,505,207 | Riggs | Apr. 25, 1950 |

FOREIGN PATENTS

| Number | Country | Date |
|---|---|---|
| 166,186 | Great Britain | July 11, 1921 |
| 320,903 | Great Britain | Oct. 25, 1929 |
| 328,473 | Great Britain | May 1, 1930 |
| 451,472 | Great Britain | Aug. 7, 1936 |
| 464,401 | Great Britain | Apr. 12, 1937 |